(12) United States Patent
Ishizaki (10) Patent No.: US 8,330,969 B2
(45) Date of Patent: Dec. 11, 2012

(54) PRINT DATA GENERATION APPARATUS

(75) Inventor: Koji Ishizaki, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1125 days.

(21) Appl. No.: 12/232,222

(22) Filed: Sep. 12, 2008

(65) Prior Publication Data

US 2009/0073502 A1    Mar. 19, 2009

(30) Foreign Application Priority Data

Sep. 14, 2007  (JP) ................. 2007-239322

(51) Int. Cl.
*G06F 3/12* (2006.01)
*G06K 15/10* (2006.01)
*G06K 9/00* (2006.01)
(52) U.S. Cl. ......... 358/1.13; 358/1.8; 382/123; 382/187
(58) Field of Classification Search ................. 358/1.13, 358/445
See application file for complete search history.

(56) References Cited

U.S. PATENT DOCUMENTS

| 5,803,629 | A  | * | 9/1998 | Neville et al. ................. 400/304 |
| 6,421,461 | B1 | * | 7/2002 | Arai et al. ..................... 382/187 |
| 2007/0230750 | A1 | * | 10/2007 | Ikeda et al. .................. 382/123 |
| 2008/0088860 | A1 | * | 4/2008 | Yoshida ........................ 358/1.8 |

FOREIGN PATENT DOCUMENTS

| JP | 04-270486 A | 9/1992 |
| JP | 2006-141062 | 6/2006 |

* cited by examiner

*Primary Examiner* — Steven Kau
*Assistant Examiner* — Neil R McLean
(74) *Attorney, Agent, or Firm* — Rabin & Berdo, P.C.

(57) ABSTRACT

A print data generation apparatus includes a pattern data registration unit, a pattern data conversion unit and an image conversion unit. The pattern data registration unit registers pattern data corresponding to a print image readable by an electronic pen printed on a recording medium. The pattern data conversion unit converts the print image into the pattern data registered in the pattern data registration unit. The image conversion unit converts the pattern data converted by the pattern data conversion unit into drawing data of the print image.

28 Claims, 12 Drawing Sheets

| 1 | 1 | 2 | 1 | 3 | 4 |
|---|---|---|---|---|---|
| 1 | 3 | 4 | 2 | 1 | 2 |
| 2 | 3 | 1 | 1 | 3 | 4 |
| 2 | 4 | 1 | 3 | 1 | 1 |
| 3 | 3 | 1 | 1 | 2 | 1 |
| 1 | 4 | 1 | 1 | 2 | 3 |

|  | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0020 |  |  | . | .. | ... | . | . | . | . |  |  |  |  |  |  | ... |
| 0030 | .. | .. | .. | .. | .. | .. | .. | .. | .. | .. | .. | .. | .. | .. | .. | .. |
| 0040 | ... | ... | ... | ... | ... | ... | ... | ... | ... | ... | ... | ... | ... | ... | ... | ... |
| 0050 | ... | ... | ... | ... | ... | ... | ... | ... | ... | ... | ... | ... | ... | ... | ... | ... |
| 0060 | ... | ... | ... | ... | ... | ... | ... | ... | ... | ... | ... | ... | ... | ... | ... | ... |
| 0070 | ... | ... | ... | ... | ... | ... | ... | ... | ... | ... | ... | ... | ... | ... | ... | ... |
| 0080 |  |  |  |  |  |  |  |  |  |  |  |  |  |  |  |  |

| L | C | R | L | C | R |
|---|---|---|---|---|---|
| 1 | 1 | 2 | 1 | 3 | 4 |
| 1 | 3 | 4 | 2 | 1 | 2 |
| 2 | 3 | 1 | 1 | 3 | 4 |
| 2 | 4 | 1 | 3 | 1 | 1 |
| 3 | 3 | 1 | 1 | 2 | 1 |
| 1 | 4 | 1 | 1 | 2 | 3 |

FIG. 8B

| | |
|---|---|
| 0x41 | 0x4B |
| 0x4B | 0x51 |
| 0x58 | 0x4B |
| 0x5c | 0x60 |
| 0x68 | 0x44 |
| 0x4C | 0x46 |

PRINT DATA GENERATION APPARATUS

BACKGROUND OF THE INVENTION

1. Field of the Invention

The invention relates to a print data generation apparatus generating print data inputtable in handwriting with an electronic pen.

2. Description of Related Art

An electronic pen as a data input device for computerizing data such as various application documents and medical records is easier to use than keyboard or mouse, and is in heavy usage to record handwriting input by a pen as data. An "Anoto pen" developed by Anoto Group AB of Sweden is known as a representative example of such an electronic pen. The "Anoto pen" is used with a sheet of dedicated paper (also referred to as Anoto paper) having a predetermined dot pattern (also refereed to as an Anoto pattern) printed thereon. The "Anoto pen" has a small camera mounted at a pen tip of a normal ballpoint pen and the like for reading the dot pattern on the dedicated paper, and has a data communication device for transmitting read data to an information terminal device in the vicinity thereof.

For example, when a user writes a character, etc. or touches an image on the dedicated paper with the "Anoto pen", the small camera detects the dot pattern on the dedicated paper with a movement of the pen, thereby obtaining handwriting data (also referred to as stroke data) of the character, image, etc. written by the user. Such handwriting data are transmitted by the data communication device from the "Anoto pen" to the information terminal device such as a personal computer and a mobile phone in the vicinity of the "Anoto pen".

A method of preparing print data used for printing the dot pattern to be detected by the "Anoto pen" has been introduced.

For example, Japanese Un-examined Patent Application Publication No. 2006-141062 discloses a method of preparing the print data. However, in such a method, when image data of the dot pattern is formed, the dot pattern is generated as a raster data image. Moreover, a large volume of the image data needs to be handled to arrange the raster data image in an image document, causing a problem of decreasing performance levels of a data preparation process and a data transfer process of a printer driver and a data receiving process and a data analysis process of a printer.

The invention has been made to reduce (if not prevent) an occurrence of the above problems, and at least one aspect of the invention is to provide a print data generation apparatus capable of printing a special sheet having a dot pattern for detecting the handwriting data by the electronic pen using an inexpensive general-purpose printer and capable of increasing performance levels of a data creation process of a printer driver, a data transfer process, a data receiving process of the printer, a data analysis process and the like.

BRIEF SUMMARY OF THE INVENTION

According to an aspect of the invention, a print data generation apparatus includes: a pattern data registration unit registering pattern data corresponding to a print image readable by an electronic pen printed on a recording medium; a pattern data conversion unit converting the print image into the pattern data registered in the pattern data registration unit; and an image conversion unit converting the pattern data converted by the pattern data conversion unit into drawing data of the print image.

According to another aspect of the invention, a print data generation apparatus includes: a pattern data registration unit registering pattern data corresponding to first image information prepared based on an image formed in a first region on a recording medium capable of being read by an electronic pen obtaining handwriting data with a movement of a pen tip; a pattern data conversion unit converting the first image information into the pattern data registered in the pattern data registration unit; a first image conversion unit converting the pattern data converted by the pattern data conversion unit into first print drawing data drawn with a first color material to be optically read by the electronic pen; a second image conversion unit converting a second image information prepared based an image formed in a second region on the recording medium into second print drawing data drawn with a second color material; and an image composition unit combining the first print drawing data converted by the first image conversion unit and the second print drawing data converted by the second image conversion unit.

According to yet another aspect of the invention, a print data generation apparatus generating print data to be used to print a base image having a combination of a plurality of kinds of pattern data, the print data generation apparatus includes: a code information storage unit storing code information corresponded to each of the pattern data; a generation unit generating the base image; a conversion unit converting the base image generated by the generation unit into the code information; and an output unit outputting the code information converted by the conversion unit.

Additional features and advantages of the invention will be more fully apparent from the following detailed description of embodiments, the accompanying drawings and the associated claims.

BRIEF DESCRIPTION OF THE DRAWINGS

A more complete appreciation of the aspects of the invention and many of the attendant advantage thereof will be readily obtained as the same becomes better understood by reference to the following detailed description when considered in connection with the accompanying drawings, wherein.

DETAILED DESCRIPTION OF PREFERRED EMBODIMENTS

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Preferred embodiments of the invention are described in detail referring to the drawings, wherein like reference numerals designate identical or corresponding parts throughout the several views.

First Embodiment

Figure 1:
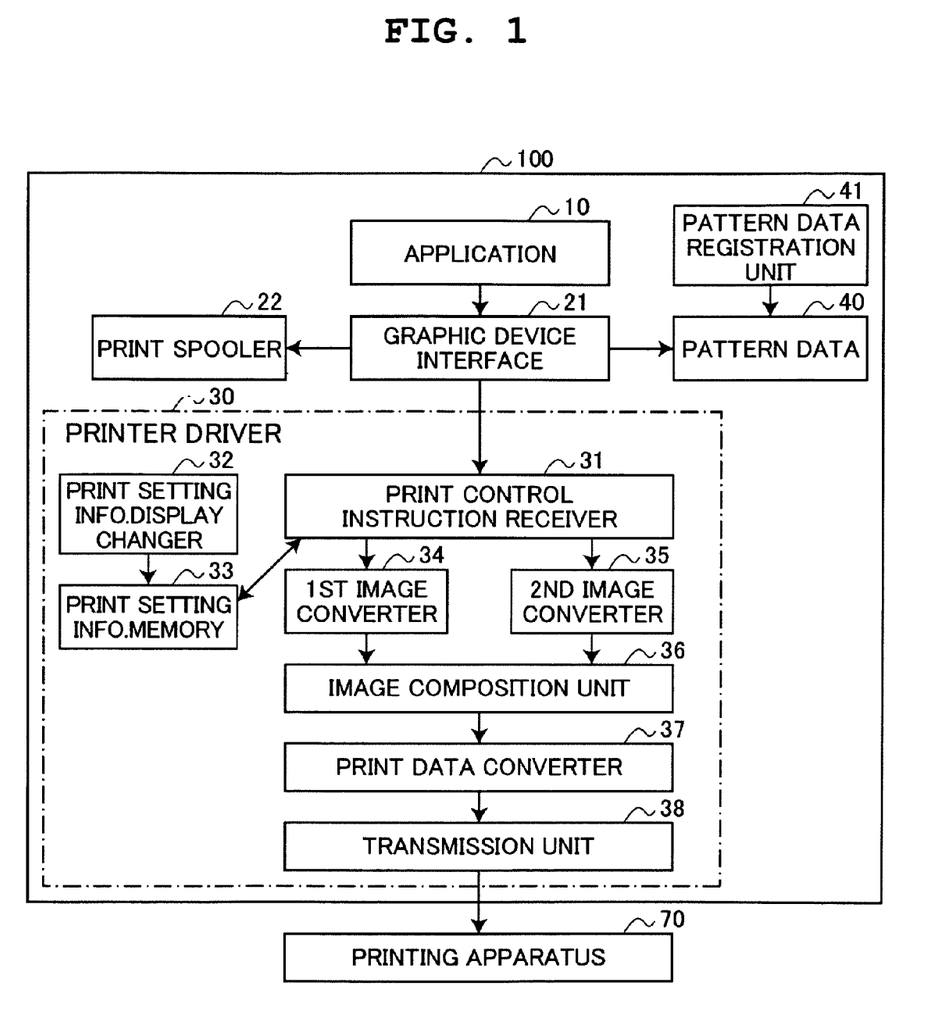
FIG. 1 is a block diagram illustrating a print data generation apparatus according to a first embodiment of the invention.

Referring to FIG. 1, a print data generation apparatus 100 according to a first embodiment of the invention is illustrated. The print data generation apparatus 100 includes an application 10, a graphic device interface 21 serving as a pattern data conversion unit, a print spooler 22, a printer driver 30, pattern data 40 and a pattern data registration unit 41.

The application 10 serving as an application program prepares a print document and provides a print execution instruction to the graphic device interface 21. The graphic interface 21 provides a pattern data conversion function that is described later and a graphic drawing (hereafter referred to as a print data drawing) that is used by the application 10 for execution of printing the print document. The print spooler 22 administrates the print data drawing used by the application 10 for execution of printing the print document as a print job. The pattern data 40 includes a combination of a plurality of dot patterns read by an electronic pen that is described later, and in the first embodiment, a user prepares the pattern data 40 with a TrueType font beforehand. The pattern data registration unit 41 registers the pattern data 40 in an operating system.

The printer driver 30 includes a print control instruction receiver 31, a print setting information display changer 32, a print setting information memory 33, a first image conversion unit 34, a second image conversion unit 35, an image composition unit 36, a print data conversion unit 37 and a transmission unit 38.

The print control instruction receiver 31 receives the beginning and end of a print job, an instruction of an image conversion method and the print data drawing. The print setting information display changer 32 displays a current set content on a display device such as a display and receives a set content change by the user from an external input device such as a mouse and a keyboard. The print setting information memory 33 stores print set information that is input through the print setting information display changer 32. The first image conversion unit 34 converts first image information converted into the pattern data by the graphic device interface 21 into first print drawing data drawn in black (K) that is a first color material. The second image conversion unit 35 converts second image information into second print drawing data drawn in cyan (C), magenta (M) and yellow (Y) each of which is a second color material. The image composition unit 36 combines the first and second print drawing data converted by the first and second image conversion units 34 and 35, respectively. The print data converter 37 converts the data combined by the image composition unit 36 into print control data that is dependent on the printing apparatus 70. The transmission unit 38 transmits the print control data converted by the print data converter 37 to the printing apparatus 70.

Figure 2:
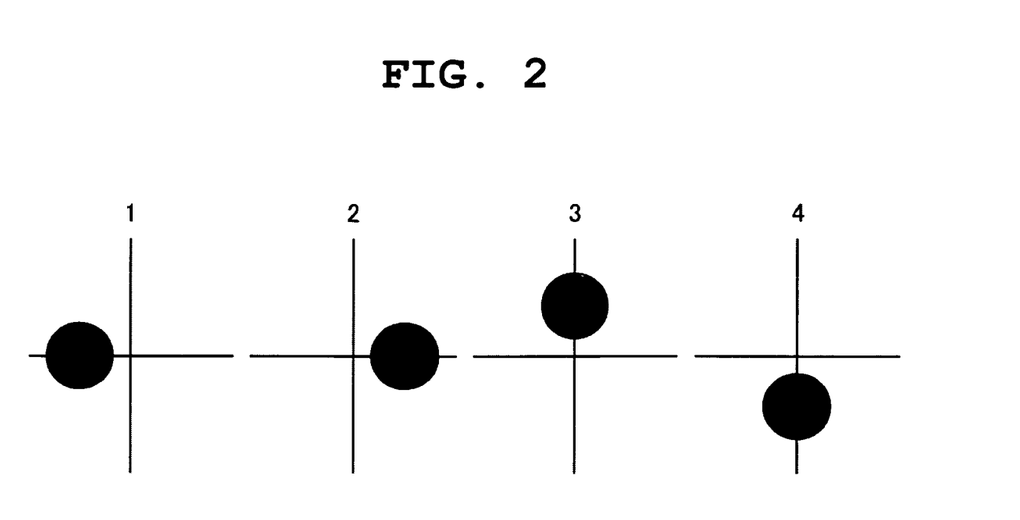
FIG. 2 is a schematic diagram illustrating an example of dot displacement in a quaternary notation system.
Figure 4:
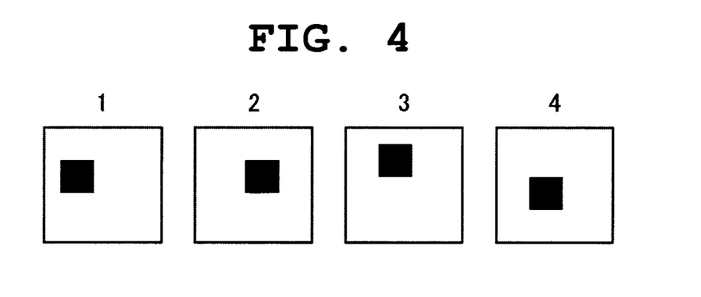
FIG. 4 is a schematic diagram illustrating an example of registration of a pattern corresponding to the quaternary notation system.
Figure 5:
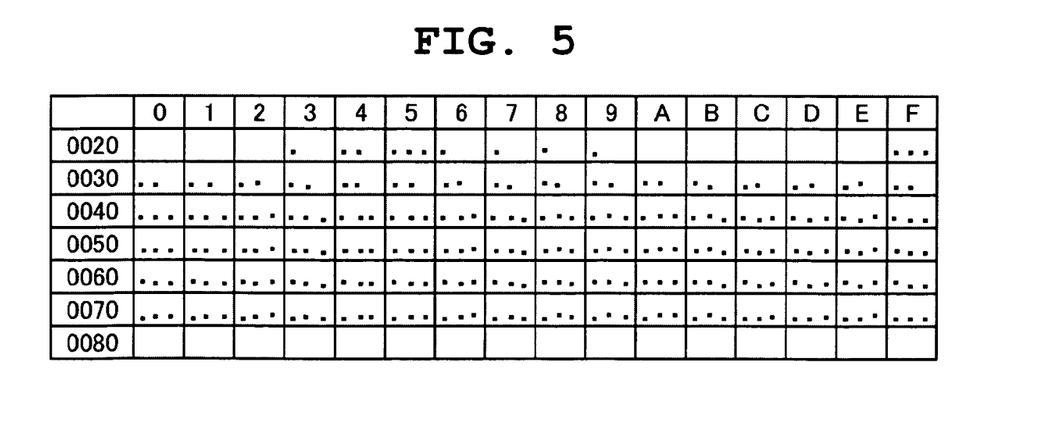
FIG. 5 is a schematic diagram illustrating an example of registration of a pattern having a combination of patterns in an amount of three dots.

Referring to FIGS. 2 through 5, an example of the dot pattern to be read by the electronic pen is illustrated according to the first embodiment of the invention. The dot pattern is formed by displacing dots in vertical or horizontal directions from respective interception points in a lattice having lattice lines with an interval of 0.3 mm, and the displacement of dots is expressed in a quaternary notation system as illustrated in FIG. 2. The dots are arranged in the lattice lines having the interval of 0.3 mm. As illustrated in FIGS. 3A and 3B, a unit for the dot pattern is six by six (6×6) in height and width (i.e., six by six in the vertical and horizontal directions), and the displacement of dots is numerically arranged in the quaternary notation system, respectively. Such a data arrangement includes a numerical value indicating a position coordinate.

Where the dot pattern is generated as the pattern data 40, each of the dots in the dot pattern can be registered as one of four patterns as illustrated in FIG. 4. A position of the dot is expressed by the quaternary notation system. In other words, the dot position is expressed by a numeric value of a single digit, thereby reducing a volume of data to be ⅛ compared to a situation in which the dot is actually calculated and arranged.

However, according to the first embodiment, the pattern combined with a plurality of dots is registered as one font. In the first embodiment, a pattern combined up to three (3) dots in width is prepared as a glyph of the TrueType font format to express with the dots in six by six (6×6) in height and width, and a character code corresponding to each glyph is defined beforehand. Although the pattern combined up to three (3) dots in width is registered in the first embodiment, alternatively, a pattern combined with at least four (4) dots in width or a pattern combined with height and width may be registered. However, it should be noted that the greater the number of dots to be registered, the greater the volume of data to be registered.

A size of each dot needs to be set in a recognizable size by the small camera mounted in the electronic pen and in a printable size that is a size surely printed by the printing apparatus 70. According to the first embodiment, a resolution is 600 dots per inch (dpi), and pixels of two by two (2×2) in height and width are formed in such a manner to arrange the dots with the resolution of 600 dpi. Where the TrueType font is generated, the dot pattern is defined in such a manner to be most suitable in a situation in which twelve (12) points (1 point=1/72 inch) are designated since the dot pattern to be read by the electronic pen is much smaller than a regular character. Here, a height of the character is arranged in such a manner to be 0.3 mm. Precisely, a height of an actual character is smaller than 0.3 mm due to dependency on the resolution of the printing apparatus 70. Specifically, the height of the character is arranged in such a manner to be seven (7) dots where the character is converted into the resolution of 600 dpi.

Figure 6:
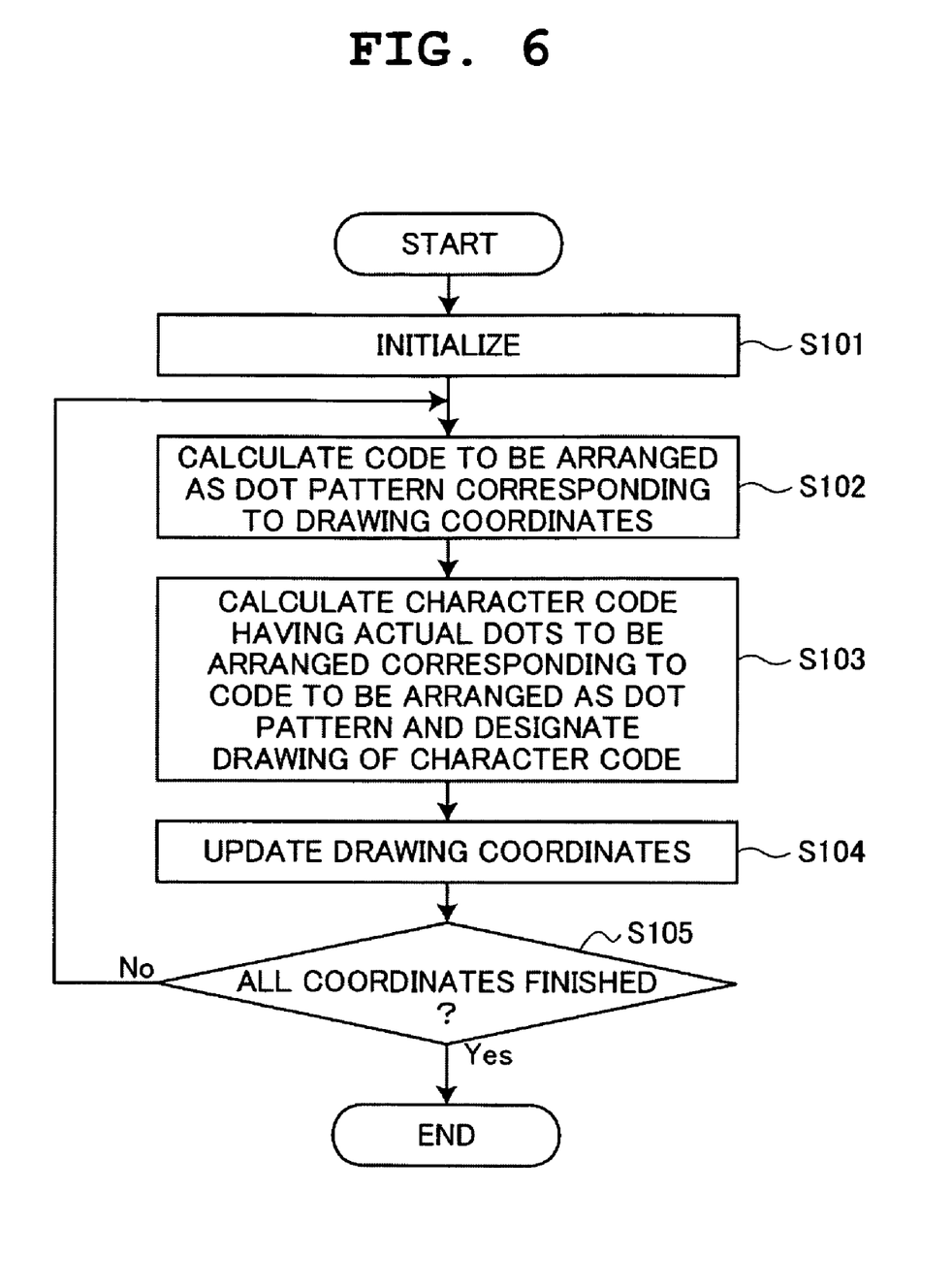
FIG. 6 is a flowchart illustrating an example procedure for drawing pattern data.

Referring to FIG. 6, a flowchart illustrates an example procedure for converting a dot pattern portion on the form sheet to be read by the electronic pen into a character code.

Figure 7A:
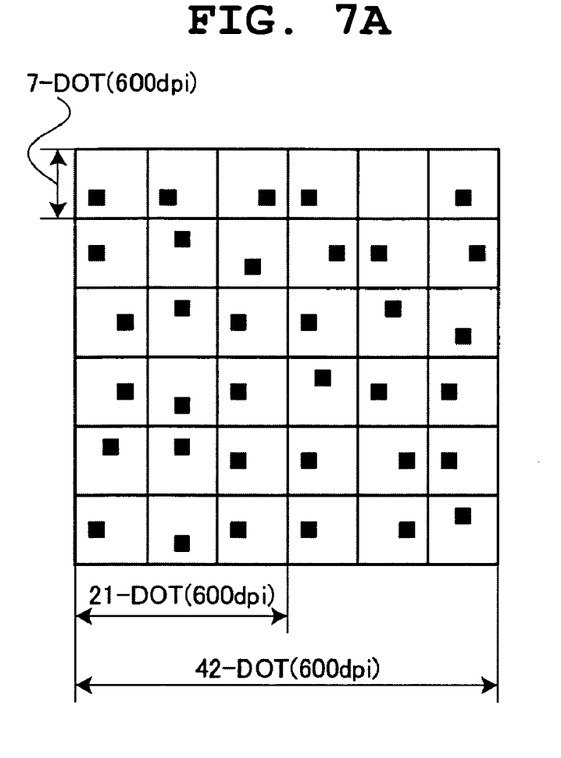
FIGS. 7A and 7B are schematic diagrams illustrating an example size of the dot pattern in a case of 600 dpi.
Figure 7B:
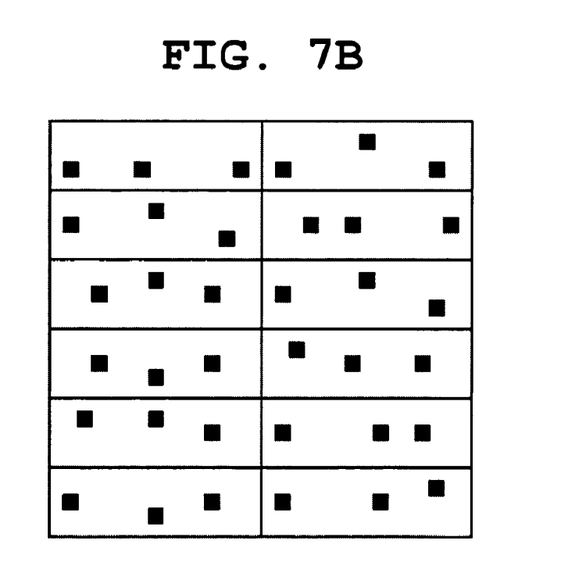

The dot pattern to be read by the electronic pen is formed in a collection of dots in six by six (6×6) in height and width as described above with reference to FIGS. 3A and 3B, and is expressed in a size of forty two (42) bits in height and forty two (42) bits in width in 600 dpi in the first embodiment as illustrated in FIG. 7A. Three (3) dots in width are used to express one (1) font character, thereby expressing a total of twelve (12) characters as illustrated in FIG. 7B. Consequently, one (1) font character is twenty-one (21) dots in width and seven (7) dots in height. Therefore, twenty-one bits by seven bits (21 bits×7 bits) is expressed by one (1) code (i.e., 8 bits), allowing a decrease in volume of the data to 1/18 or below.

In step S101, the application 10 initializes a number of calculation and a coordinate position on the form sheet to be used for drawing the dot pattern.

Figure 3A:
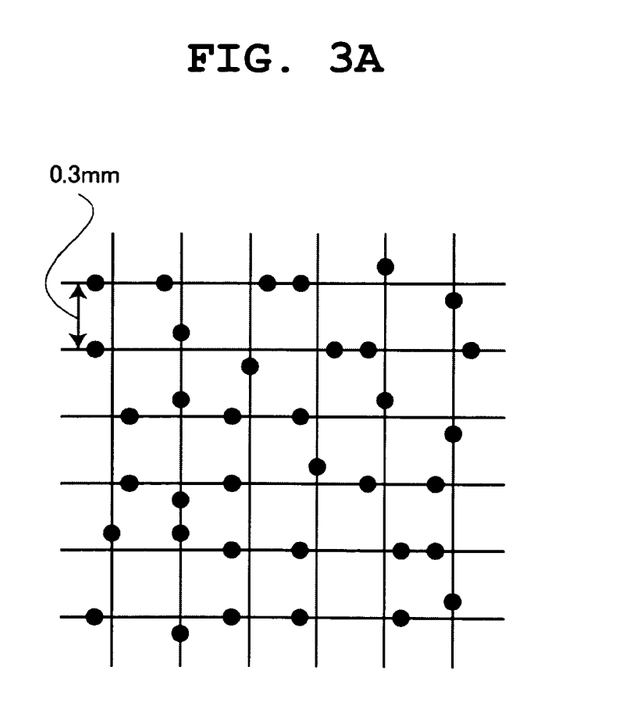
FIGS. 3A and 3B are schematic diagrams illustrating an example of a code expressed by a dot pattern of 6×6.
Figure 3B:
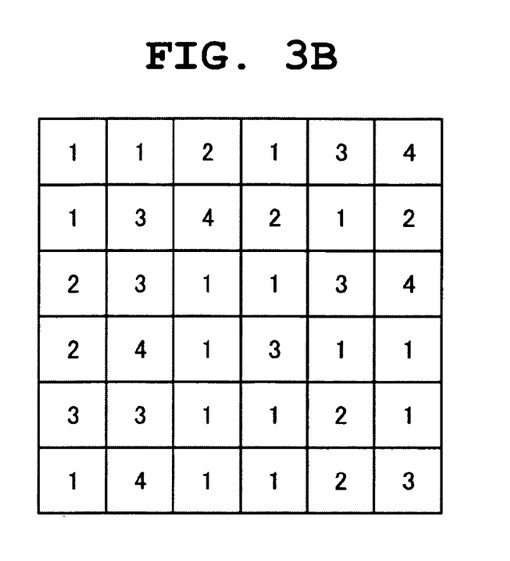
Figure 8A:
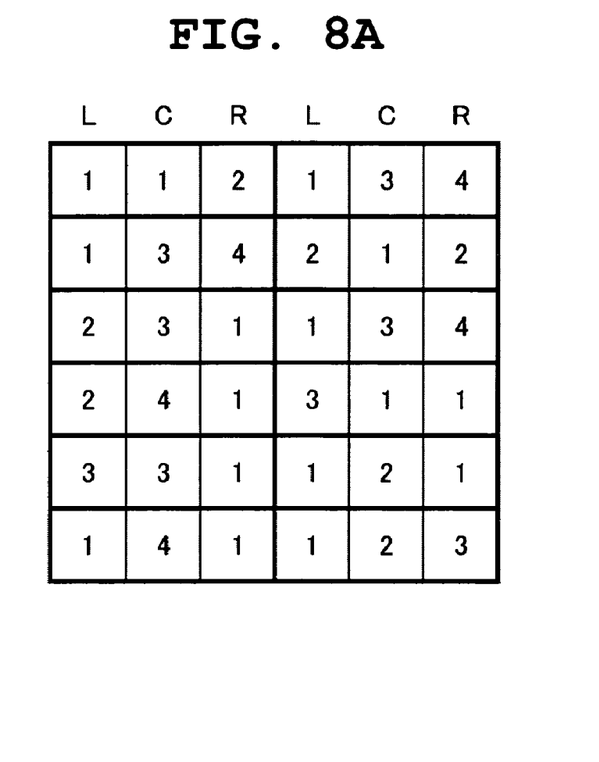
FIGS. 8A and 8B are schematic diagrams illustrating an example of a character code corresponding to a code array expressed by the dot pattern.

In step S102, the application 10 calculates a code to be arranged as the dot pattern corresponding to drawing coordinate. As illustrated in FIGS. 3A, 3B and 8A, the code is a numeric array of six by six (6×6) in height and width and is expressed by the quaternary notation system of one (1) through four (4).

Subsequently, the application 10 transmits the code to be arranged as the dot pattern to the graphic device interface 21. Upon receiving the code, the graphic device interface 21 calculates a character code corresponding to the code, calculated in step S102, to be arranged as the dot pattern. The calculation of the character code is expressed by a calculation formula below.

$$\text{Character code} = 64 + ((L-1) \times 16) + ((C-1) \times 4) + (R-1),$$

where L, C and R represent values as follows.

L: a value in left of a code array expressed by three dots in width.
C: a value in a middle of the code array expressed by three dots in width.
R: a value in right of the code array expressed by three dots in width.

Figure 8B:
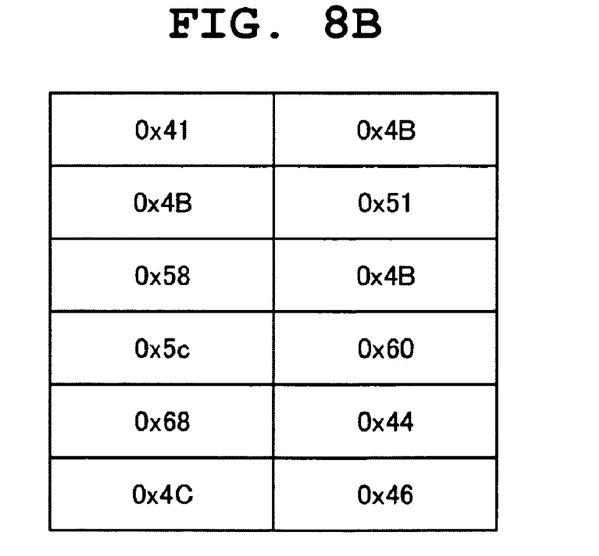

An example of the code array corresponding to the dot pattern is described with reference to FIG. 8A, and a calculation example of the character code is described with reference to FIG. 8B.

In step S103, the graphic device interface 21 designates all the twelve characters such that the TrueType font registered beforehand in the pattern data registration unit 40 corresponds to the character code calculated by the above calculation formula.

When the calculation of the character code and the correspondence with the TrueType font are finished in step S103, flow proceeds to step S104 in which the graphic device interface 21 updates coordinates in which the dot pattern in drawn.

Next, in step S105, the graphic device interface 21 determines whether or not the TrueType font characters are arranged in all the coordinates across one page. Where the TrueType font characters are not arranged in all the coordinates across one page (No in Step S105), flow proceeds back to step S102. Where the graphic device interface 21 determines that the TrueType font characters are arranged in all the coordinates across one page (Yes in step S105), the graphic device interface 21 ends a series of processes.

Figure 9:
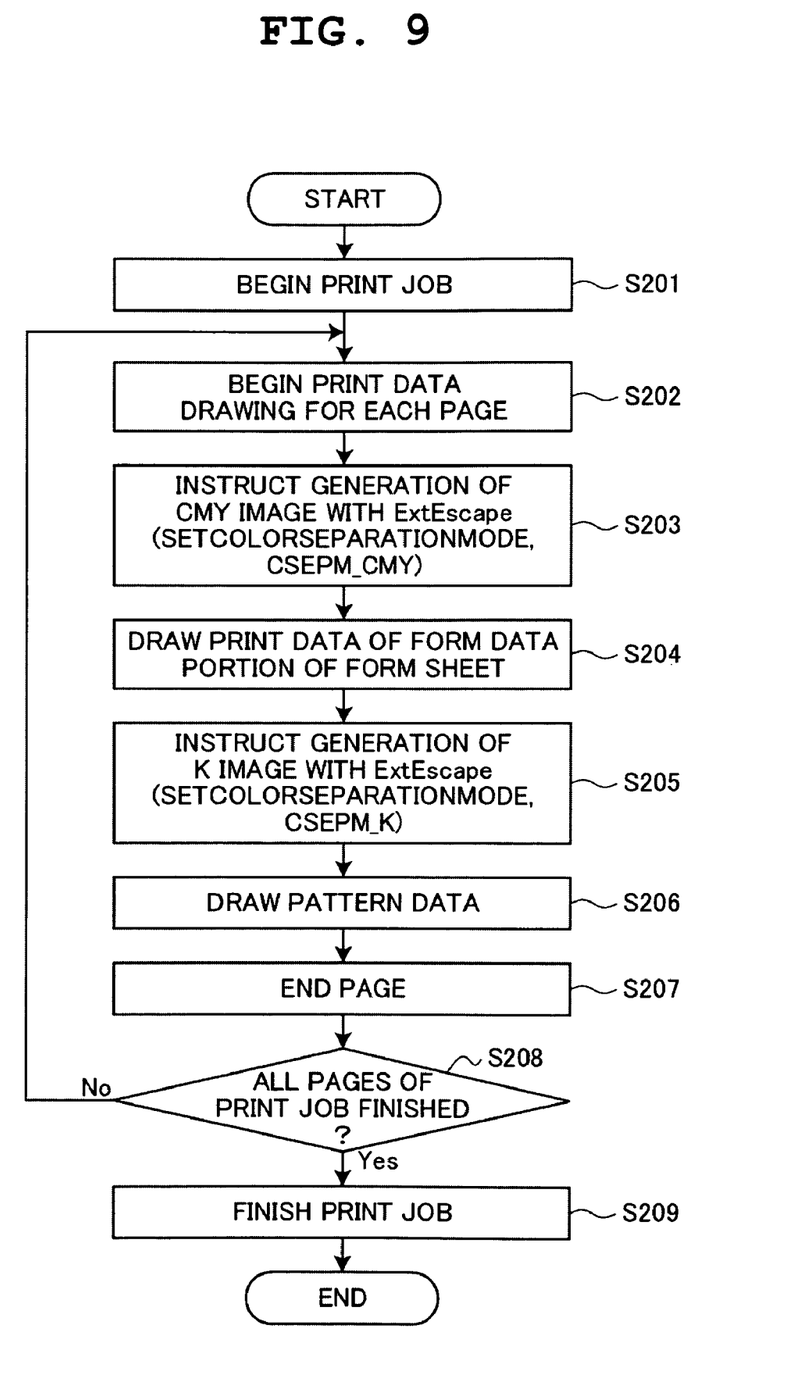
FIG. 9 is a flowchart illustrating an example procedure for a series of printing operation

Referring to FIG. 9, a flowchart illustrates an example procedure for a series of printing operation according to the first embodiment.

The user registers the TrueType font of the pattern data 40 prepared by using the pattern data registration unit 41 in the operating system before printing the print document. The operating system provides a function that can be used to register the pattern data 40 therein.

Next, the user calls the print setting information display changer 32 through the graphic device interface 21 for setting a print style, etc. of the print document, so that the current print set is displayed on the display device, thereby inputting a set change with an external input device such as the mouse and keyboard. The print setting information memory 33 stores the print set information changed by the user.

Subsequently, the application 10 begins a series of processes for converting the dot pattern portion of the form sheet to be read by the electric pen described above with reference to FIG. 6 into the character code. Simultaneously, the application 10 instructs the graphic device interface 21 to begin a print job in step S201 in addition to the process of the character code conversion. Upon receiving the instruction of the print job, the graphic device interface 21 executes an initiation process for the print job. Particularly, the graphic device interface 21 notifies the beginning of the print job to the print spooler 22. The graphic device interface 21 also notifies the beginning of the print job to the printer driver 30. Upon receiving the notification of the beginning of the print job, the printer driver 30 separates the print document into each page and begins the print data drawing in step S202.

Next, the application 10 determines whether the first image conversion unit 34 or the second image conversion unit 35 executes the process of the image information for drawing the print data. For example, where Windows® is used, the application 10 can use ExtEscape interface capable of designating a direct instruction to the printer driver 30. The ExtEscape includes an escape function ID to which "SETCOLORSEPARATIONMODE" is designated. Where the first image conversion unit 34 is used as an input parameter, "CSEPM_K" is designated. On the other hand, where the second image conversion unit 35 is used, "CSEPM_CMY" is designated. Here, values for "SETCOLORSEPARATIONMODE", "CSEPM_K", and "CSEPM_CMY" are defined as constant numbers beforehand.

In step S203, the application 10 uses the ExtEscape ("SETCOLORSEPARATIONMODE", "CSEPM_CMY"), and instructs the printer driver 30 to generate an image with CMY. Upon receiving the instruction, the printer driver 30 begins a preparation for generating the image with CMY. Here, the image to be generated according to the instruction is normal data to be printed in a sheet.

In step S204, the graphic device interface 21 draws the second print drawing data (i.e., a portion corresponding to a form data portion of the form sheet and being unnecessarily read by the electronic pen) with the second color materials of CMY that do not absorb an infrared light. Therefore, an image CMY is generated. Particularly, the image conversion is executed according to a flowchart in FIG. 10 that is described later. Upon receiving the instruction from the graphic device interface 21 to generate the second print drawing data having CMY, the print control instruction receiver 31 switches the second image conversion unit 35 to be used to the image conversion method designated.

Figure 10:
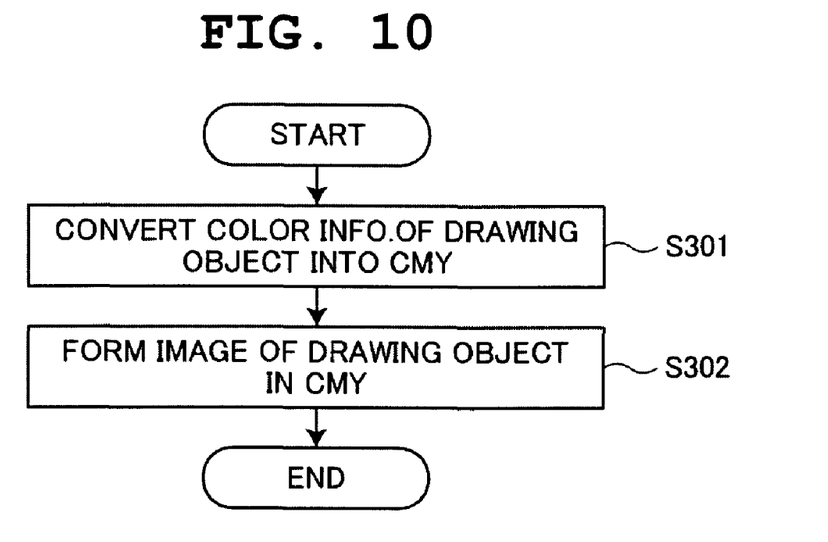
FIG. 10 is a flowchart illustrating an example procedure for converting an image by a second image converter.

The second image conversion unit 35 converts color information of a drawing object into CMY in step S301 in the flowchart of FIG. 10, and forms an image of the drawing object in CMY in step S302. Here, an image format can be easily processed by the image composition unit 36 or the print data converter 37, and is a format that is not in need of re-conversion of the image to transfer to the print apparatus 70.

Next, in step S205 in the flowchart of FIG. 9, the application 10 uses the ExtEscape ("SETCOLORSEPARATIONMODE", "CSEPM_K"), and instructs the printer driver 30 to generates an image with K. Upon receiving the instruction, the printer driver 30 begins a preparation for generating the image with K. Here, the image to be generated according to the instruction is an Anoto pattern data to be printed in a sheet.

In step S206, the graphic device interface 21 draws the first print drawing data (i.e., a portion corresponding to the dot pattern of the form sheet and to be read by the electronic pen) with the first color material K that absorbs the infrared light. Therefore, an image K is generated. Particularly, the image conversion is executed according to a flowchart in FIG. 11 that is described later. Upon receiving the instruction from the graphic device interface 21 to generate the first print drawing data having K, the print control instruction receiver 31 switches the first image conversion unit 34 to be used to the image conversion method designated.

Figure 11:
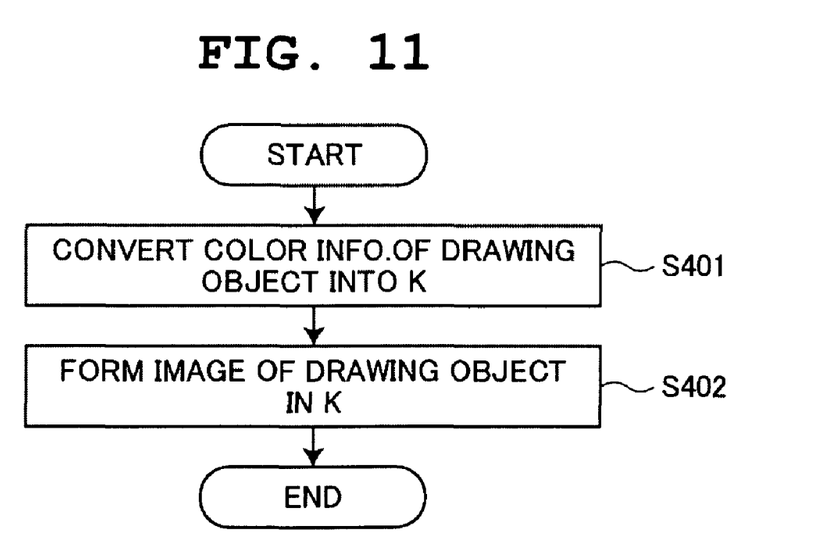
FIG. 11 is a flowchart illustrating an example procedure for converting an image by a first image converter.

The first image conversion unit 34 decodes the character code converted corresponding to the dot pattern of the drawing object into Bitmap data of the Anoto pattern data by the font data registered as the pattern data, and converts the color information into K in step S401 in a flowchart of FIG. 11. Next, the first image conversion unit 34 forms an image of the drawing object in K in step S402 in the flowchart of FIG. 11. Here, an image format can be easily processed by the image composition unit 36 or the print data converter 37, and is a format that is not in need of re-conversion of the image to transfer to the print apparatus 70.

The image composition unit 36 combines the image CYM generated in step S204 and the image K generated in step S206. Subsequently, the print data converter 37 converts a composite image of the image CYM and the image K combined by the image composition unit 36 into a print control code that is dependent on the print apparatus 70. The transmission unit 38 transmits the print control code converted by the print data converter 37 to the printing apparatus 70, thereby finishing a page of the print data drawing in step S207.

The graphic device interface 21 determines whether or not drawing of all pages of the print jobs is finished in step S208. Where not all of pages are drawn (No in step S208), flow proceeds back to step S202. Where the graphic device interface 21 determines that the drawing of all pages is finished (Yes in step S208), flow proceeds to step S209.

In step S209, the graphic device interface 21 executes a post-process such as opening a resource of a memory used for the page drawing and finishes the print job.

Therefore, according to the first embodiment, a sheet of dedicated paper having the dot pattern for detecting the handwriting data by the electronic pen can be printed by an inexpensive general-purpose printer. The dot pattern to be read by the electronic pen is defined as the font beforehand, and the font corresponding to the dot pattern to be drawn is designated by the character code, so that a series of processes can be executed quickly by an advantage of font cache. Moreover, since the dot pattern is designated as the code instead of an bit image, the bit image is not passed from the application 10 to the graphic device inter face 21 or from the graphic device inter face 21 to the printer driver 30, thereby reducing a volume of the data to be processed.

Second Embodiment

In a print document having print data for reading such as a bar-code, for example, when a dot pattern to be read by an electronic pen is printed in all printable regions across a page, the dot pattern is even printed in a portion of the read data such as the bar-code. Such a dot pattern printed in the portion for reading may cause a decrease in a reading rate of the bar-code.

According to the second embodiment, a print data generation apparatus 200 capable of analyzing the print document, extracting the portion of the read data such as the bar-code, and not generating the dot pattern to be read by the electronic pen in a vicinity of the portion of the read data is provided.

The print data generation apparatus 200 according to the second embodiment is similar to the print data generation apparatus 100 described above according to the first embodiment. Therefore, only components and/or configurations of the print data generation apparatus 200 that differ from those of the print data generation apparatus 100 will be described, and like components will be given the same reference numerals as above and description thereof will be omitted.

Figure 12:
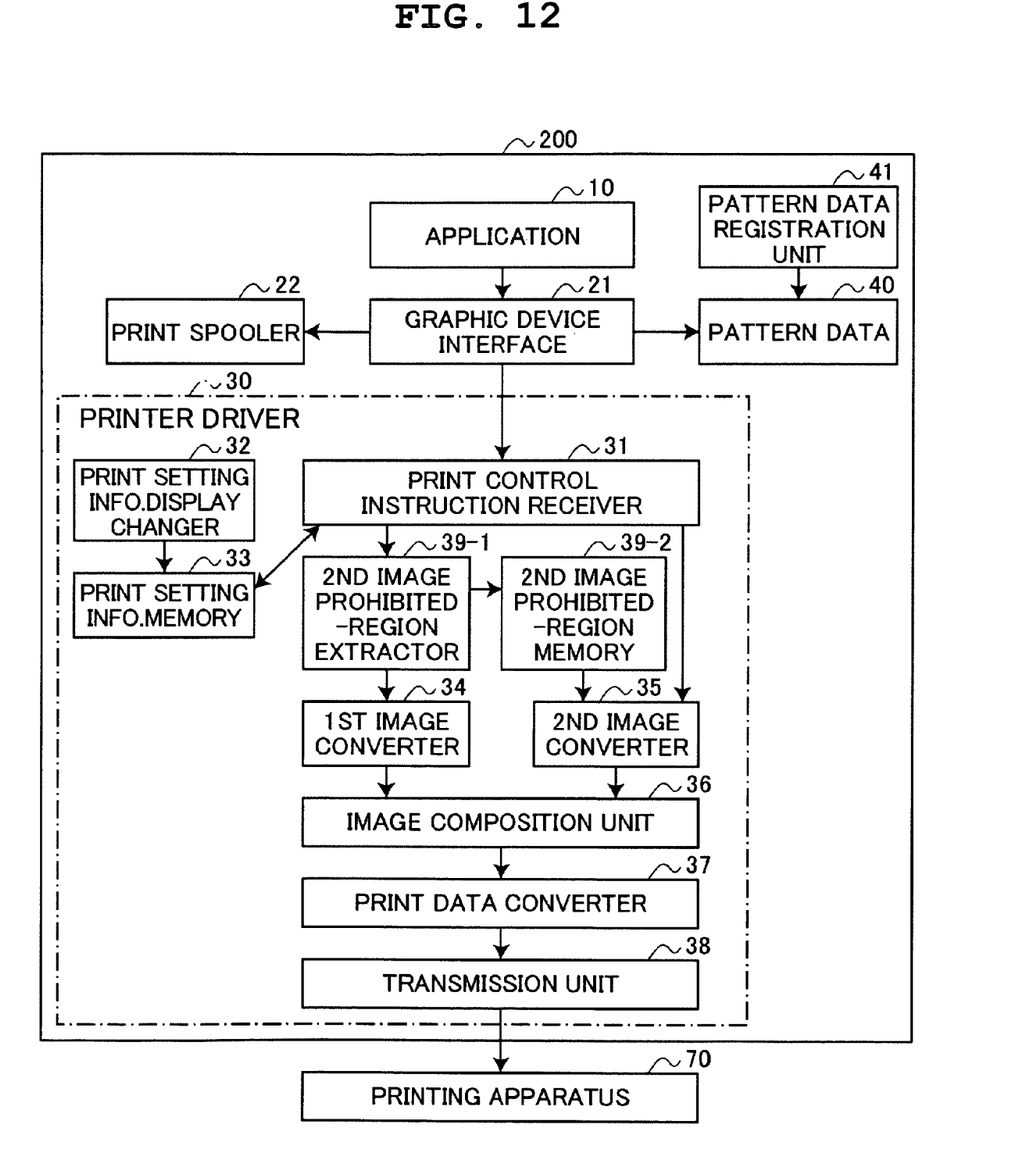
FIG. 12 is a block diagram illustrating a print data generation apparatus according to a second embodiment of the invention.

Referring to FIG. 12, the print data generation apparatus 200 according to the second embodiment is illustrated in a block diagram. The print data generation apparatus 200 includes a second image prohibited-region extractor 39-1 and a second image prohibited-region memory 39-2 in addition to the components and/or configurations of the print data generation apparatus 100 described above in the first embodiment.

The second image prohibited-region extractor 39-1 analyzes each drawing object of the print data drawing, and extracts an image region of the bar-code, etc. in a case of drawing the object in a page as an image. The second image prohibited-region memory 39-2 stores an image prohibited-region extracted by the second image prohibited-region extractor 39-1.

Specifically, the second image prohibited-region extractor 39-1 classifies each drawing object of the print data, detects a code generating an image of the bar-code or an OCR (Optical Character Reader) character, etc. to be read by a reading device after printing the print document, and extracts an image region for the bar-code or the OCR character, etc. as a second image prohibited-region. The second image prohibited-region memory 39-2 stores the second image prohibited-region with a number of drawing objects as region rectangular information.

Now, flow of print data formation by the print data generation apparatus 200 is described. The print data formation by the print data generation apparatus 200 is similar to the flow of the print data formation described above according to the first embodiment except for step S204 (described above with reference to the flowchart of FIG. 9) in which the print data in the form data portion of the form sheet is drawn and for step S103 (described above with reference to the flowchart of FIG. 6) in which the dot pattern is drawn. In the second embodiment, a process corresponding to step S204 of the first embodiment is described below with reference to a flowchart of FIG. 13.

Figure 13:
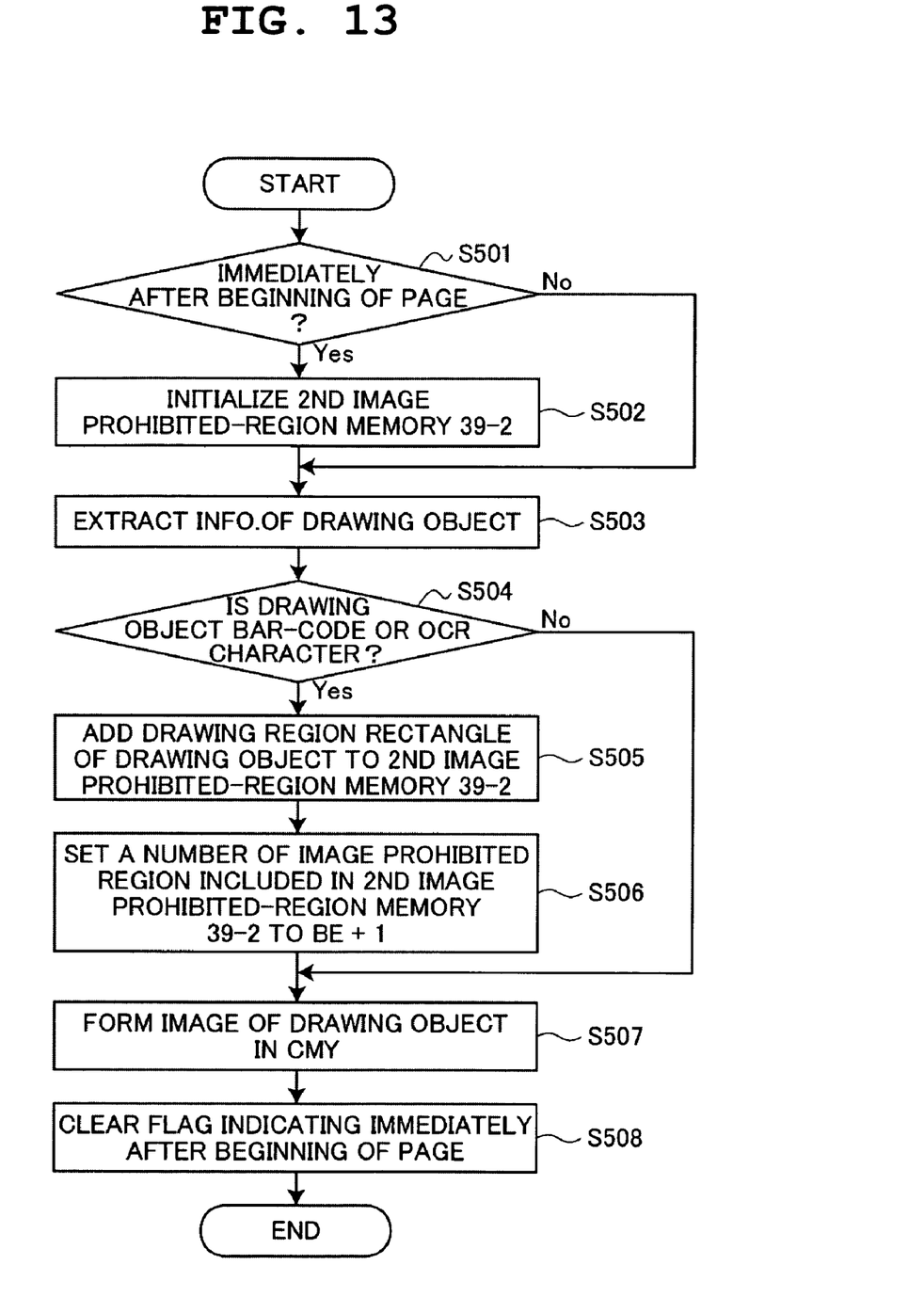
FIG. 13 is a flowchart illustrating an example procedure for drawing print data in a form data area of a form sheet according to the second embodiment.

In step S501 in the flowchart of FIG. 13, upon receiving the instruction for generating the image from the application 10, the graphic device interface 21 determines whether or not it is immediately after beginning of the print data drawing for each page. Where it is immediately after beginning of the print data drawing for each page (Yes in step S501), flow proceeds to step S502 in which the graphic device interface 21 initializes the second image prohibited-region memory 39-2 and sets the image prohibited-region included therein as zero. On the other hand, where it is not immediately after beginning of the print data drawing for each page (NO in step S501), flow proceeds to step S503.

In step S503, the second image prohibited-region extractor 39-1 analyzes the drawing object and extracts information such as distinctiveness of the drawing object.

In step S504, the second image prohibited-region extractor 39-1 classifies the drawing object, and determines whether or not the drawing object is the bar-code or the OCR character. Where the drawing object is determined to be the bar-code or the OCR character (Yes in step S504), the second image prohibited-region extractor 39-1 calculates, based on an attribution of a size of typestyle or a volume of the code to be printed, a size of rectangle in which the image of the bar-code or the OCR character is actually formed, and adds the calculated size of rectangle the second image prohibited-region memory 39-2. On the other hand, where the drawing object is not determined to be the bar-code or the OCR character (No in step S504), flow proceeds to step S507.

In step S506, when the drawing region of the drawing object is stored in the second image prohibited-region memory 39-2, the graphic device interface 21 sets a number of image prohibited-region included in the second image prohibited-region memory 39-2 to be +1.

In step S507 in the flowchart of FIG. 13, the second image conversion unit 35 converts the color information of the drawing object into CMY as described above in step S301 in the flowchart of FIG. 10, and forms an image of the drawing object in CMY as described above in step S302 in the flowchart of FIG. 10. Here, an image format can be easily processed by the image composition unit 36 or the print data converter 37, and is a format that is not in need of re-conversion of the image to transfer to the print apparatus 70.

In step S508, the graphic device interface 21 clears a flag indicating a situation immediately after the beginning of the page.

In a series of processes for drawing the character code corresponding to the dot pattern using the printer driver 30, the second embodiment includes an additional process in which the image of the dot pattern is not generated in the second image prohibited-region. In the second embodiment, a process corresponding to step S103 in the flowchart of FIG. 6 of the first embodiment is described below with reference to a flowchart of FIG. 14.

Figure 14:
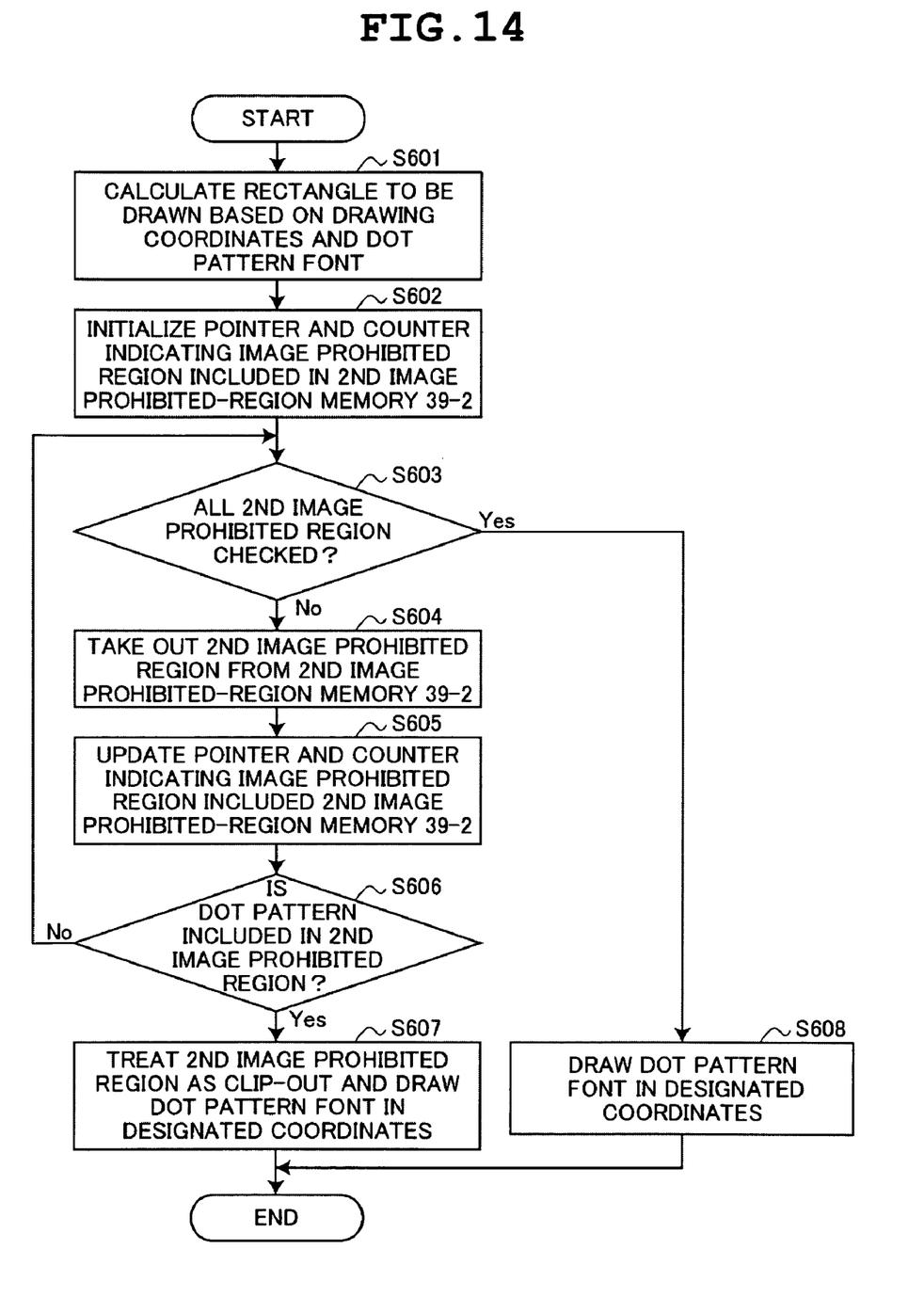
FIG. 14 is a flowchart illustrating an example procedure for drawing pattern data according to the second embodiment.

In step S601 in the flowchart of FIG. 14, the graphic device interface 21 calculates a rectangle to be drawn based on drawing coordinates and font of the dot pattern.

In step S602, the graphic device interface 21 initializes a pointer designating each of the image prohibited-region and a counter indicating a number of image prohibited-regions checked. The pointer and the counter are included in the second image prohibited-region memory 39-2.

In step S603, the graphic device interface 21 confirms whether or not all the number of the image prohibited-regions included in the second image prohibited-region memory 39-2 is checked. Where all the prohibited-regions are checked (Yes in step S603), flow proceeds to step S608 in which the graphic device interface 21 draws the dot pattern font in the designated coordinates without a clip-out region that is not to be drawn.

In step S604, the graphic device interface 21 takes out the second image prohibited-region designated by the pointer from the second image prohibited-region memory 39-2.

Subsequently, in step S605, the graphic device interface 21 updates the pointer designating the image prohibited-region and the counter indicating the number of the checked image-prohibited regions included in the second image-prohibited region memory 39-2.

In step S606, the graphic device interface 21 confirms whether or not the rectangle calculated in step S601 for drawing the font of the dot pattern and the second image-prohibited region taken out in step S601 have an overlap. Where the overlap is confirmed (Yes in step S606), flow proceeds to step S607. Where the overlap is not confirmed (No in step S606), flow proceeds back to step S603.

In step S607, the graphic device interface 21 treats the second image prohibited region taken out in step S604 as the clip-out region being not to be drawn, and draws the dot pattern font in the designated coordinates.

The drawing in steps S607 and S608 is executed by the flowchart of FIG. 11 described above according to the first embodiment. Therefore, the graphic device interface 21 instructs the first image conversion unit 34 to convert the color information into K. Upon receiving the instruction from the graphic device interface 21, the first image conversion unit 34 decodes the character code converted corresponding the dot pattern of the drawing object, and coverts the color information into K as described in step S401 in the flowchart of FIG. 11. Subsequently, the first image conversion unit 34 forms the image of the object in K in step S402 in the flowchart of FIG. 11. Here, the image format can be easily processed by the image composition unit 36 or the print data converter 37, and is a format that is not in need of re-conversion of the image to transfer to the print apparatus 70.

Therefore, according to the second embodiment, a sheet of dedicated paper having the image for reading such as the bar-code or the OCR character and the dot pattern for detecting the handwriting data by the electronic pen can be printed by an inexpensive general-purpose printer. The dot pattern to be read by the electronic pen is defined as the font beforehand, and the font corresponding to the dot pattern to be drawn is designated by the character code, so that a series of processes can be executed quickly by an advantage of font cache.

Third Embodiment

In the second embodiment described above, the print data generation apparatus 200 extracts the portion of the read data such as the bar-code included in the print drawing data so as to provide the region in which the dot pattern to be ready by the electronic pen is not printed. According to a third embodiment, a print region of a print drawing object designated by an application program is a region in which a dot pattern to be read by an electronic pen is not printed.

Figure 15:
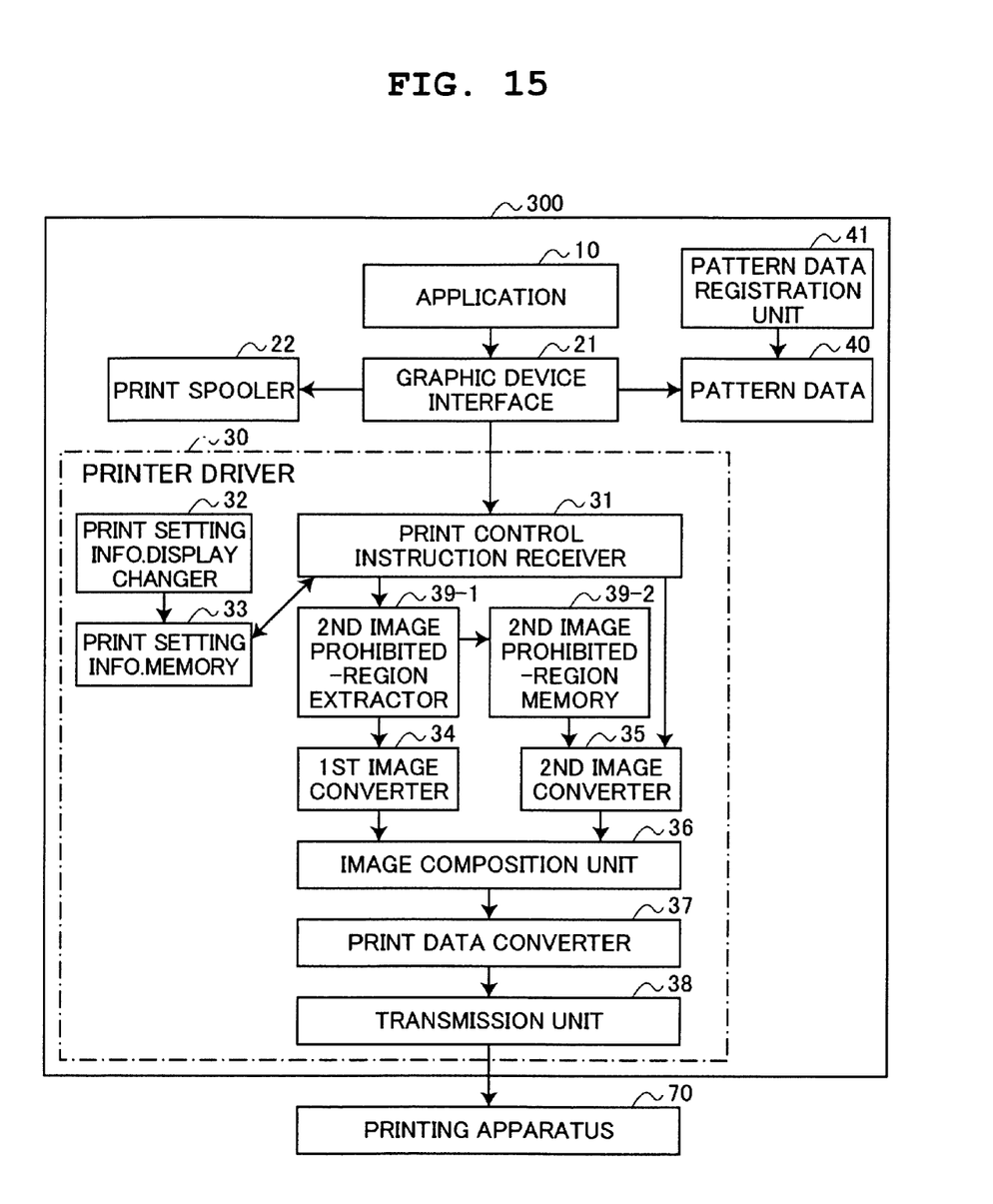
FIG. 15 is a block diagram illustrating a print data generation apparatus according to a third embodiment of the invention.

Referring to FIG. 15, a print data generation apparatus 300 is illustrated according to the third embodiment, and is similar to the print data generation apparatus 200 described above according to the second embodiment. Therefore, only components and/or configurations of the print data generation apparatus 300 that differ from those of the print data generation apparatus 200 will be described, and like components will be given the same reference numerals as above and description thereof will be omitted.

Now, flow of print data formation by the print data generation apparatus 300 is described. The print data formation by the print data generation apparatus 300 is similar to the flow of the print data formation described above according to the second embodiment except for a second image prohibited-region start instruction and a second image prohibited-region end instruction that are provided between the application 10 and the printer driver 30. The second image prohibited-region start instruction instructs to start providing the drawing object for the second image prohibited-region, and the second image prohibited-region end instruction instructs to end the drawing object for the second image prohibited-region.

For the second image prohibited-region start instruction and the second image prohibited-region end instruction, ExtEscape interface by which the application 10 can designate the instruction directly to the printer driver 30 can be used. In an escape function ID of the ExtEscape, "STARTBARCODEMODE" is designated as the second image prohibited-region start instruction and "ENDBARCODEMODE" is designated as the second image prohibited-region end instruction. The "STARTBARCODEMODE" and "ENDBARCODEMODE" are given numerical values that are defined as constant numbers beforehand.

In a course of drawing the print data converted into the image by using the second image conversion unit 35, the application 10 provides the second image prohibited-region start instruction to the printer driver 30 before drawing the object of the drawing object of the read data such as the bar-code and provides the second image prohibited-region end instruction to the printer driver 30 after drawing the object of the drawing object of the read data such as the bar-code.

Upon receiving the instruction from the application 10, the graphic device interface 21 of the printer driver 30 extracts the image region of the drawing object as the second image prohibited-region and instructs the second image prohibited-region memory 39-2 to store as rectangular information according to the instruction from the application 10 in a process of extracting the second image prohibited-region by the second image prohibited-region extractor 39-1.

Particularly, an example case in which the application 10 draws the bar-code as a bitmap is described. The application 10 designates "SETCOLORSEPARATIONMODE" to the escape function ID of the ExtEscape, inputs "CSEPM_CMY" as an input parameter, instructs the drawing using the second image conversion unit 35, and provides an instruction for drawing the bitmap of the bar-cord or form sheet data.

Here, the application 10 designates the "SETBARCODEMODE" to the escape function ID of the ExtEscape. Moreover, the application 10 provides the second image prohibited-region start instruction to the graphic device interface 21 of the printer driver 30. The graphic device interface 21 instructed by the application 10 generates the bitmap of the bar-code and draws as a normal bitmap drawing object. After drawing the bitmap drawing object, the application 10 designates the "ENDBARCODEMODE" to the escape function ID of the ExtEscape and provides the second image prohibited-region end instruction to the graphic device interface 21.

Upon receiving the second image prohibited-region end instruction, the graphic device interface 21 provides the instruction to the second image prohibited-region extractor 39-1. The second image prohibited-region extractor 39-1 extracts an image region of the object drawn when each drawing object is drawn on a page (i.e., when an image region of the object is drawn between the second image prohibited-region start instruction and the second image prohibited-region end instruction), and adds the extracted image region to the second image prohibited-region memory 39-2 as the rectangular information.

Next, the application 10 designates the "SETCOLORSEPARATIONMODE" to the escape function ID of the ExtEscape, inputs "CSEPM_K" as an input parameter, and instructs the graphic device interface 21 to generate the dot pattern to be read by the electric pen using the first image conversion unit 34. Upon receiving the instruction, the graphic device interface 21 instructs the first image conversion unit 34 not to generate the dot pattern to be read by the electronic pen in the second image prohibited-region stored in the second image prohibited-region memory 39-2.

The image data generated by the first and second image conversion units 34 and 35 are combined by the image composition unit 36, are converted into the print control data depended on the printing apparatus 70 in the print data converter 37, and are transmitted to the printing apparatus 70 through the transmission unit 38.

Therefore, according to the third embodiment, a sheet of dedicated paper having the image for reading such as the bar-code and the dot pattern for detecting the handwriting data by the electronic pen can be printed by an inexpensive general-purpose printer while maintaining a read tolerance of the bar-code, etc. optionally designated by the application program. The dot pattern to be read by the electronic pen is defined as the font beforehand, and the font corresponding to the dot pattern to be drawn is designated by the character code, so that a series of processes can be executed quickly by an advantage of font cache.

According to the first, second and third embodiments, the process of the image conversion is executed within the printer driver 30. Alternatively, the printer driver 30 may transmit a registration command registering the font illustrated in FIG. 5 within the printing apparatus 70, a selection command of such a font and a code indicating each dot pattern, thereby executing the image conversion into the dot pattern in the printing apparatus 70. Alternatively, the font illustrated in FIG. 5 maybe registered in the printing apparatus 70 beforehand. Yet, the print data generation apparatuses 100, 200 and 300 may input the Anoto pattern only without application program data attached.

As can be appreciated by those skilled in the art, numerous additional modifications and variation of the invention are possible in light of the above-described teachings. For example, in addition to the printer driver 30, the embodiments of the invention can be applied to a printer, facsimile, a multifunction peripheral and a copier. It is therefore to be understood that, within the scope of the appended claims, the disclosure of this patent specification may be practiced otherwise than as specifically described herein.

What is claimed is:

1. A print data generation apparatus comprising:
a first print drawing data generation unit configured to generate first print drawing data to be printed on a base of a recording medium:
a second print drawing data generation unit configured to generate second print drawing data to be printed on the recording medium based on a drawing instruction of received data;
a print-prohibited region extraction unit configured to extract a print-prohibited region for prohibiting the first print drawing data from being printed in a region in which optical read recognition information is printed based on input information indicating the optical read recognition information; and
an image composition unit configured to combine the first print drawing data and the second print drawing data,
wherein the first print drawing data generation unit does not generate the first print drawing data in a region corresponding to the print-prohibited region extracted by the print-prohibited region extraction unit.

2. The print data generation apparatus according to claim 1, wherein the optical read recognition information includes bar-code information.

3. The print data generation apparatus according to claim 1, wherein the print-prohibited region extraction unit is configured to calculate a size of a rectangle in which an image is actually formed based on attribution information of the optical read recognition information.

4. The print data generation apparatus according to claim 1, wherein the first print drawing data generation unit is configured to confirm whether or not a region occupied with a rectangle in which an image is formed and the print-prohibited region have an overlap.

5. The print data generation apparatus according to claim 1, wherein the optical read recognition information includes OCR (Optical Character Recognition) information.

6. The print data generation apparatus according to claim 1, further comprising a pattern data registration unit configured to register pattern data as a font.

7. A print data generation apparatus comprising:
a first print drawing data generation unit configured to generate first print drawing data drawn with a first color material to be optically read by an electronic pen on a recording medium capable of being read by the electronic pen, the electronic pen obtaining handwriting data with a movement of a pen tip;
a second print drawing data generation unit configured to generate second print drawing data drawn with a second color material other than the first color material on the recording medium;
a print-prohibited region extraction unit configured to extract a print-prohibited region for prohibiting the first print drawing data from being printed in a region in which optical read recognition information is printed based on input information indicating the optical read recognition information: and
an image composition unit configured to combine the first print drawing data and the second print drawing data,
wherein the first print drawing data generation unit does not generate the first print drawing data in a region corresponding to the print-prohibited region extracted by the print-prohibited region extraction unit.

8. The print data generation apparatus according to claim 7, further comprising an image region extraction unit configured to extract a region having optical read recognition information on the recording medium.

9. The print data generation apparatus according to claim 7, further comprising an image region designation unit configured to designate a particular image region on the recording medium.

10. The print data generation apparatus according to claim 7, wherein the first color material is a color material including carbon.

11. The print data generation apparatus according to claim 7, further comprising a pattern data registration unit configured to register pattern data, wherein the pattern data includes an Anoto pattern.

12. The print data generation apparatus according to claim 7, further comprising a pattern data registration unit configured to register pattern data, wherein at least a portion of the pattern data is registered as a font.

13. The print data generation apparatus according to claim 12, wherein the font includes a TrueType font.

14. The print data generation apparatus according to claim 12, wherein the font includes an OpenType font.

15. The print data generation apparatus according to claim 7, wherein the optical read recognition information includes bar-code information.

16. The print data generation apparatus according to claim 7, wherein the print-prohibited region extraction unit is configured to calculate a size of a rectangle in which an image is actually formed based on attribution information of the optical read recognition information.

17. The print data generation apparatus according to claim 7, wherein the first print drawing data generation unit is configured to confirm whether or not a region occupied with a rectangle in which an image is formed and the print-prohibited region have an overlap.

18. The print data generation apparatus according to claim 7, wherein the optical read recognition information includes OCR information.

19. The print data generation apparatus according to claim 7, further comprising a pattern data registration unit configured to register pattern data as a font.

20. A print data generation apparatus generating print data to be used to print a base image having a combination of a plurality of kinds of pattern data, the print data generation apparatus comprising:
a font code information storage unit configured to store font data corresponding to each of the plurality of kinds of pattern data;
a generation unit configured to generate the base image, wherein the base image comprises a combination of the plurality of kinds of pattern data;
a conversion unit configured to convert each of the plurality of kinds pattern data of the base image generated by the generation unit into font code information by using the font data stored in the font code information storage unit; and
an output unit configured to output the font code information corresponding to the base image generated by the generation unit.

21. The print data generation apparatus according to claim 20, wherein the pattern data includes a pattern to be optically read by an electronic pen.

22. The print data generation apparatus according to claim 20, wherein the pattern data includes an Anoto pattern.

23. The print data generation apparatus according to claim 20, wherein the font code information corresponds to a dot pattern.

24. The print data generation apparatus according to claim 23, wherein the font code information includes TrueType font information.

25. The print data generation apparatus according to claim 23, wherein the font code information includes OpenType font information.

26. The print data generation apparatus according to claim 20, wherein a pattern combined with height and width is registered as a font.

27. The print data generation apparatus according to claim 20, wherein a calculation formula of a character code is as below:

Character code=64+((*L*−1)×16)+((*C*−1)×4)+(*R*−1), where L represents a value on a left side of a code array expressed by three dots in width, C represents a value in a middle of the code array expressed by three dots in width, and R represents a value on a right side of the code array expressed by three dots in width.

28. The print data generation apparatus according to claim 20, wherein a font is registered at an operating system.

* * * * *